United States Patent [19]
Longoria et al.

[11] Patent Number: 5,457,571
[45] Date of Patent: Oct. 10, 1995

[54] METALLOGRAPHIC MICROSCOPE USEFUL FOR THE CHARACTERIZATION OF CONDUCTORS DRAWING DIES

[75] Inventors: Daniel A. Longoria; Daniel C. Garcia; Fernando L. Ruiz, all of Potosi Querétaro Qro., Mexico

[73] Assignee: Centro De Investigacion Y Desarrollo Condumex SA.DE C. V., Queretaro, Mexico

[21] Appl. No.: 280,557

[22] Filed: Jul. 26, 1994

Related U.S. Application Data

[63] Continuation of Ser. No. 921,752, Jul. 30, 1992, abandoned.

[30] Foreign Application Priority Data

Feb. 21, 1992 [MX] Mexico .................................. 9200720

[51] Int. Cl.⁶ .................................................. G02B 21/06
[52] U.S. Cl. ........................ 359/389; 359/368; 359/385
[58] Field of Search .................................... 359/368–391, 359/385–393

[56] References Cited

U.S. PATENT DOCUMENTS

| | | | |
|---|---|---|---|
| 977,842 | 12/1910 | Sauveur | 359/391 |
| 3,551,019 | 12/1970 | Michel | 359/391 |
| 3,633,991 | 1/1972 | Miller | 359/389 |
| 3,721,759 | 3/1973 | Lang | 359/392 |
| 4,285,568 | 8/1981 | Elgart | 359/390 |
| 4,555,620 | 11/1985 | Bridson et al. | 359/388 |
| 4,711,537 | 12/1987 | Schindl et al. | 359/392 |
| 4,784,481 | 11/1988 | Wuerfel | 359/391 |
| 4,958,920 | 9/1990 | Jorgens et al. | 359/392 |

FOREIGN PATENT DOCUMENTS

| | | | |
|---|---|---|---|
| 164680 | 12/1985 | European Pat. Off. | 359/385 |
| 3535749 | 10/1986 | Germany | 359/385 |
| 49012 | 12/1990 | Japan | 359/385 |

*Primary Examiner*—Loha Ben
*Assistant Examiner*—Thong Nguyen
*Attorney, Agent, or Firm*—Finnegan, Henderson, Farabow, Garrett and Dunner

[57] ABSTRACT

A metallographic microscope for characterizing conductor drawing dies having a light collimating system, linear scales for horizontal and vertical axis of the platina, a positioning device on the platina, an electronic closed loop circuit for controlling the illumination through the collimating system, and a power supply and internal cabling within the body of the microscope for a video camera mounted to the lens system.

3 Claims, 5 Drawing Sheets

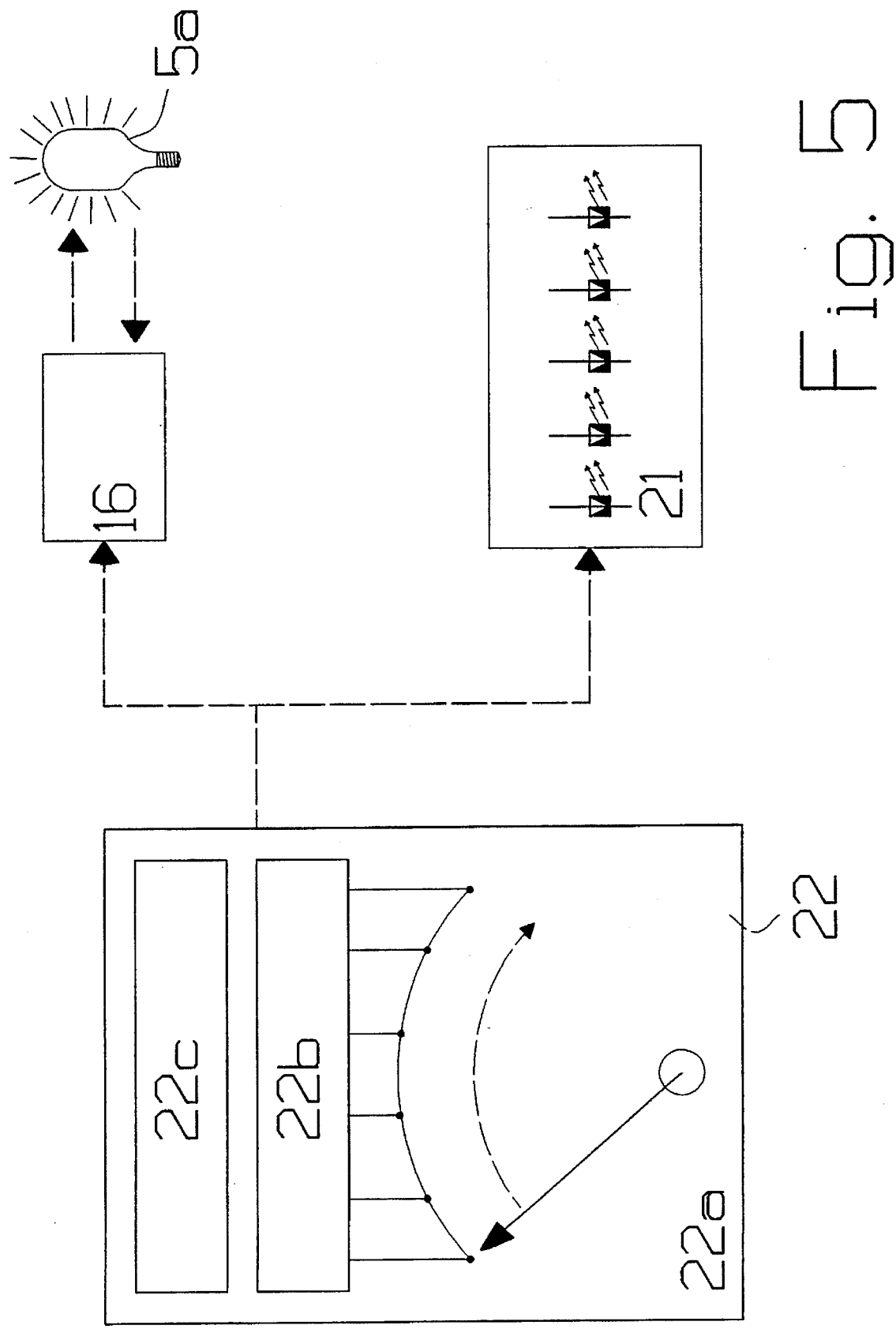

METALLOGRAPHIC MICROSCOPE USEFUL FOR THE CHARACTERIZATION OF CONDUCTORS DRAWING DIES

This application is a continuation of application Ser. No. 07/921,752, filed Jul. 30, 1992, now abandoned.

BACKGROUND OF THE INVENTION

The present invention relates to microscopes, and more particularly to metallographic microscopes.

Three known techniques for characterizing conductor drawing dies are as follows:

One is to introduce, by hand, a piece of conductor to be drawn, through the die, and then pull the conductor either manually or mechanically from the other side of the die. The diameter of the wire conductor is then measured with calibrating tools, thus determining the diameter of the die bearing. By repeating the measurements at different points along the wire, the oval shape of the wire and thus the oval shape of the die bearing may be determined.

Another known technique involves the use of molding pastes which is useful only when one tries to determine the length of the bearing and the working angle of the die, if the diameter of the bearing is above 300 microns. This means that this technique cannot be applied to smaller diameters; and also has the drawback that the measuring is done by means of a comparative reading in which the operators judgment has an influence.

Another conventional technique involves the use of a mechanical measuring device to determine the internal profile of the die. This is accomplished by introducing a needle, which tracks the shape of the internal profile which shape is then shown in a display. However, this technique is useful only when applied to diameters of more than 700 microns. It also has the drawback that the results are interpreted by the operator.

SUMMARY OF THE INVENTION

Accordingly, the invention is directed to a metallographic microscope that substantially obviates one or more of the problems due to limitations and disadvantages of the related art.

To achieve these and other inventions, and in accordance with the purpose of the invention, as embodied and broadly described, the invention is a metallographic microscope that has a body, a platina movably mounted to the body, a transmitted or reflected lighting arrangement including sources of light. An electronic circuit for the control, including monitoring, selection, and adjustment of light is integrated or mounted to the body, a collimating structure for the diascopic or transmitted illumination mounted to the body, linear scales to determine horizontal and vertical axis of the platina, an object positioning device is mounted on the platina, a power supply for a video camera and internal cabling for connection to the camera, supply signals for synchrony and video output is mounted in the body of the microscope.

This combination permits an ideal characterization of the drawing dies.

BRIEF DESCRIPTION OF THE DRAWINGS

FIG. 5 is a diagram of the discrete light intensity selector used with the microscope of the present invention.

DETAILED DESCRIPTION

Figure 1:
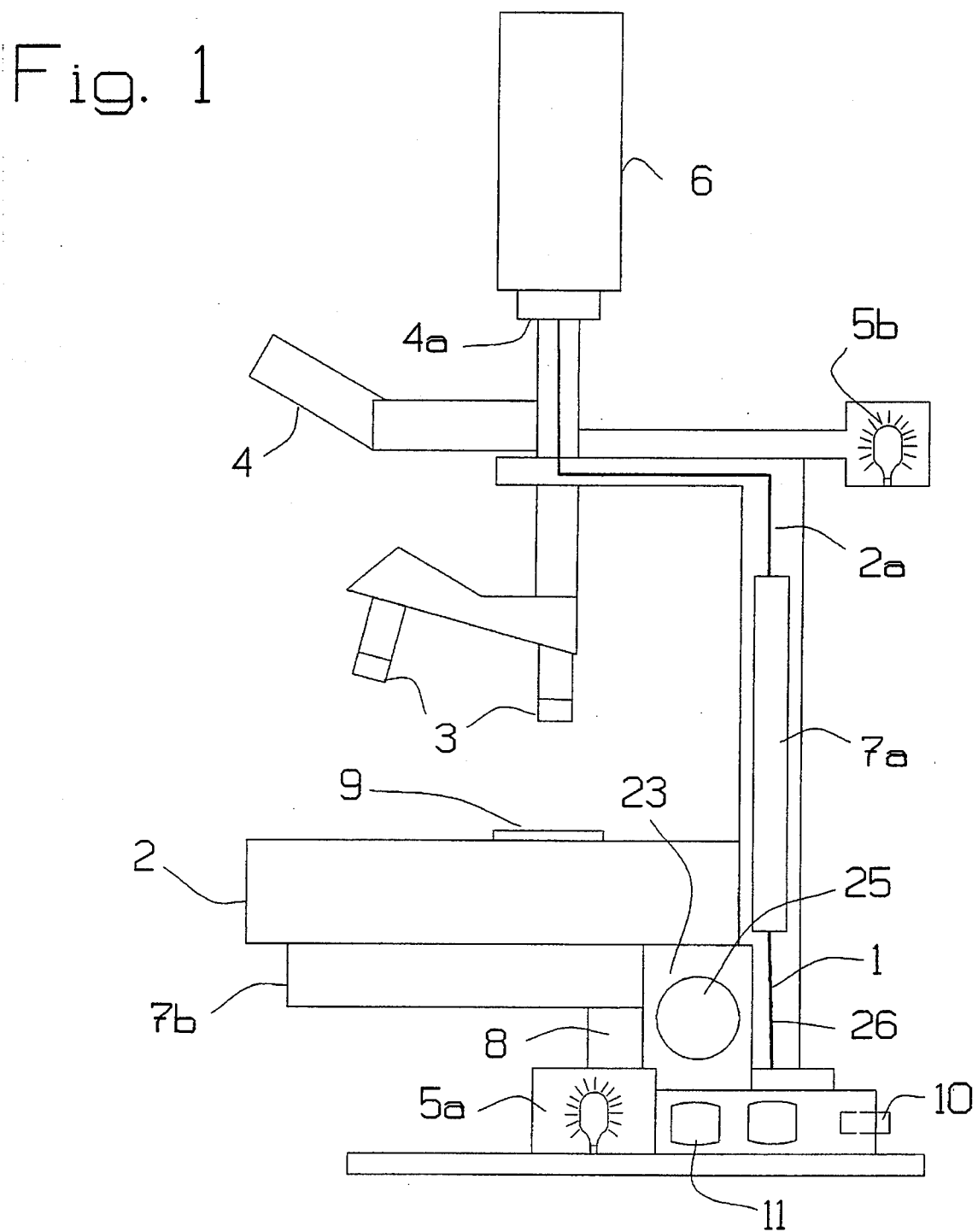
FIG. 1 is a side view of a metallographic microscope according to the present invention.

The present invention relates to improvements in a metallographic microscope useful for the characterization of conductor drawing dies. Following is a description of the embodiment illustrated in FIGS. 1 to 5 of the drawings.

The modified microscope has the following conventional parts:

a body 1, a platina 2, objective lenses 3, eye lenses 4 and 4a, a diascopic or transmitted illumination subsystem 5a, and an episcopic or reflected illumination subsystem 5b.

Figure 4:
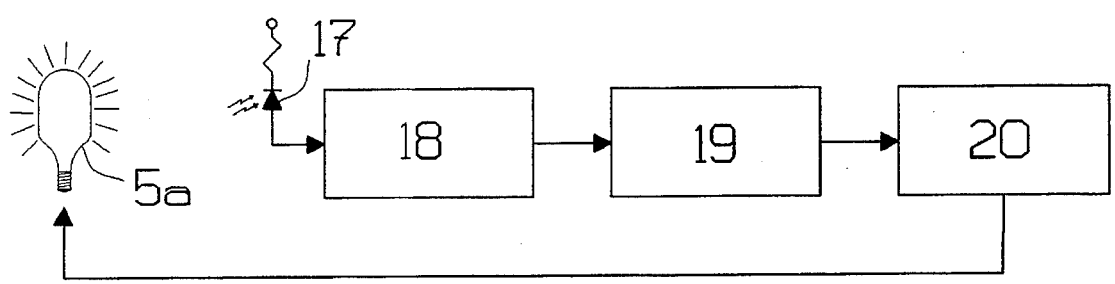
FIG. 4 is a block diagram of the closed loop control system used in the microscope of the present invention.

In accordance with the invention, an electronic circuit for the control, monitoring, selection and adjustment of the intensity of light is incorporated in the microscope. The control of the intensity of light is performed by a closed loop circuit 16 (see FIG. 4) which stabilizes the power output of the transmitted lighting subsystem 5a of FIGS. 1 and 4. FIG. 4 is a diagram of the closed loop control system 16. System 16 has an optic sensor 17 which receives the optical signal from the transmitted illumination subsystem 5a of FIGS. 1 and 4. An amplifying stage 18 receives the electric signal from the sensor 17 and amplifies it. A modulator 19 reacts to the variations of the signal and modulates the power stage 20 so that it increases or diminishes the feeding or input for the transmitted illumination subsystem 5a. Referring to FIG. 5, monitoring is accomplished by means of light emitting diodes 21, which are turned on individually, one for each selected optical power level. The selection of the different levels of light is done through rotary switches 22a, with a fixed number of discrete steps. FIG. 5 is a diagram of the discrete intensity selector 22. This selector governs the transmitted illumination subsystem 5a, and consists of rotary switches 22a, the electronic system 22b, and the light intensity adjusters 22c. The visual indicators of the light intensity 21 allow the system operator to know the light intensity that has been selected. The closed loop control system 16, as shown in FIGS. 4 and 5, maintains the light intensity of the transmitted illumination subsystem in such a way that it does not change because of changes in voltage or aging of the transmitted lighting subsystem 5a. The light intensity adjusters 10, (FIG. 1) that corresponds to each position of the selector 11 are located in the back part of the body 1 of the microscope.

Figure 2:
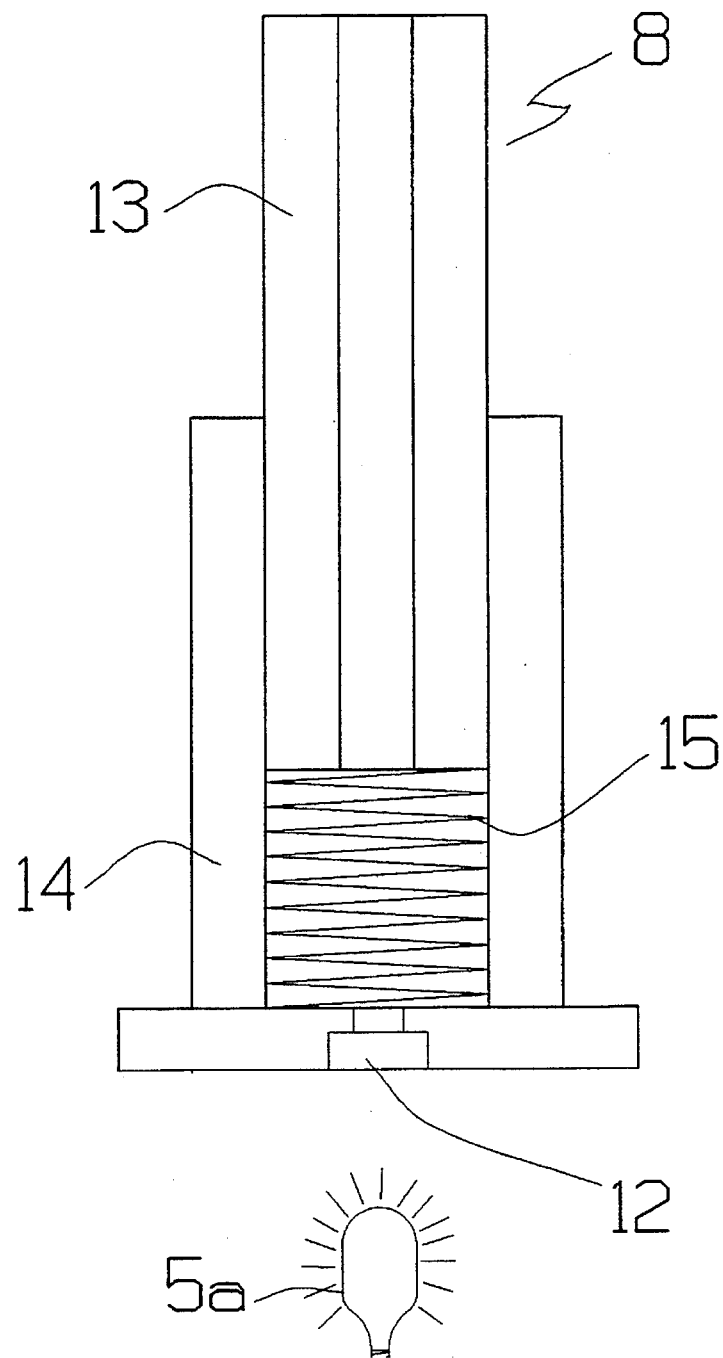
FIG. 2 is a longitudinal cross section of the light collimating system of the microscope of FIG. 1.

Both the transmitter illumination subsystem 5a and the reflected illumination subsystem 5b of FIG. 1 use a power and voltage for the light source that permits longer duration and is made for hard work. Referring to FIGS. 1 and 2, a collimating system 8, incorporated with the body delivers a continuous and flat waveform, or in other words, furnishes a uniformly projected illumination. FIG. 2 shows the parts that form the collimating system 8. The system has a diffuser 12 which delivers a uniform light front or beam, a shaft 13 which confines or, in other words, makes the light front flat, a shaft guide 14 in which the shaft is placed in order to keep it in the desired position, and a spring 15 which allows the upper part of the shaft to abut the lower part of the platina 2 of the microscope.

Referring to FIG. 2, two linear scales, 7a and 7b, are integrated with the body 1 (FIG. 1). Scale 7a, as shown in FIG. 3, is used to measure the displacement or position of the platina 2 along the vertical axis and the other scale, 7b, measures the displacement or position along the horizontal axis.

Figure 3:
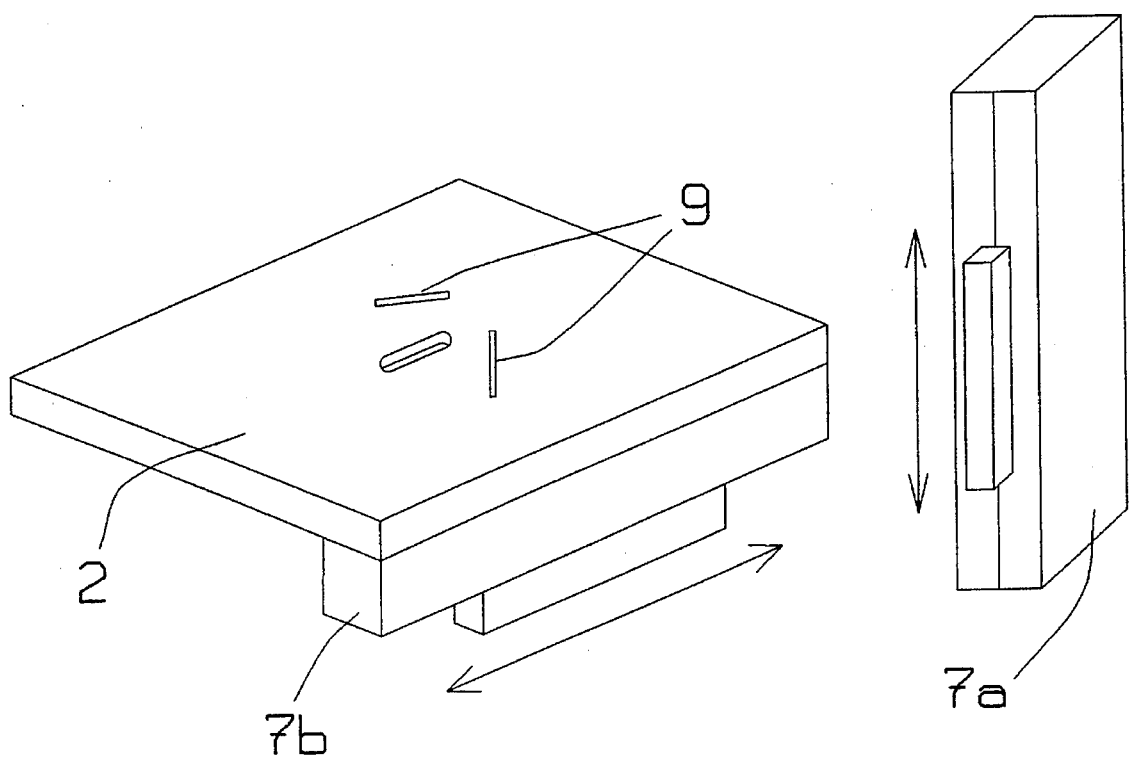
FIG. 3 is an isometric view of the platina and linear scales of the microscope of FIG. 1.

As shown in FIGS. 1 and 3, a positioning device 9, is mounted to the platina 2 in order to make placement of the die to be measured within the visual field of the camera 6 easier. A power source 23 of 24 volts, AC, 60 hertz for the video camera 6 is incorporated within the body 1 of the microscope and controlled through the same switch 25 as the microscope.

Cabling 24 is in the inside of the body 1 for feeding the camera 6 and supplying a synchrony and video output signal. The last two are accessible through connectors 26 located in the back part of the body 1 of the microscope.

EXAMPLE OF RESULTS OBTAINED WITH A METALLOGRAPHIC MICROSCOPE OF THE PRESENT INVENTION

| NUMBER OF THE DIE | 341598 | 292325 | 203768 | 341610 | 327406 | TIME IN SECONDS |
|---|---|---|---|---|---|---|
| DIAMETER (IN MICRONS OF THE BEARING | 579<br>579 | 574<br>574 | 725<br>725 | 576<br>576 | 359<br>359 | 15 |
| OVAL SHAPE (IN MICRONS OF THE BEARING | 3<br>2 | 3<br>1 | 2<br>1 | 2<br>2 | 1<br>1 | |
| ANGLE OF THE WORKING | 19<br>20 | 15<br>15 | 15<br>15 | 16<br>16 | 15<br>15 | 60 |
| ECCENTRICITY IN MICRONS OF THE BEARING | 1<br>1 | 1<br>1 | 1<br>1 | 1<br>1 | 1<br>1 | |
| HEIGHT OF THE ANGLE MEASURED IN MICRONS | 362<br>362 | 359<br>359 | 453<br>452 | 360<br>360 | 224<br>224 | |
| LENGTH OF THE BEARING (% OF THE DIAMETER) | 39<br>40 | 28<br>30 | 39<br>41 | 32<br>30 | 50<br>51 | 60 |
| CONICAL SHAPE OF THE BEARING IN MICRONS | 0<br>0 | 1<br>1 | 0<br>1 | 0<br>0 | 0<br>0 | |

With reference to the table set forth above, there are two measurements of all parameters for each side. Each line of the table corresponds to one of the measurements. DIAMETER refers to the bearing diameter. OVAL SHAPE is the difference between the vertical and horizontal diameters of the bearing. The ANGLE OF THE WORKING CONE is the measure of the angle of the working cone measured at a distance from the bearing. The distance is shown in the HEIGHT line. ECCENTRICITY corresponds to the distance between the center lines of the bearing and the working cone. LENGTH OF THE BEARING is the length of the cylindrical section of the die known as bearing and expressed as a percentage of the diameter of the same. CONICAL SHAPE refers to the difference in the upper and lower diameters of the bearing.

From the results shown in the above table, it can be seen that the measuring times are lower compared to the traditional methods. One can observe also that the number of functions are limited with regards to the span of different type of measurements with the traditional methods and the techniques of the present invention make measurements faster and measurements that cannot be made with previous techniques.

In summary, the improvements made to a metallographic microscope described herein permits coupling it to a computer and an image digitizing system, permitting the applicant to implement a computerized system for measuring diameter, oval shape, length and conical shape of the bearing, the angle and out of center of the working cone of a conductor drawing die. Thus, with the present invention, the disadvantages of the traditional methods are overcome by obtaining a larger number of measurements more accurately in a shorter time. It is contemplated that the measuring system may be sued for measurements in the metalwork automotive industry or scientific equipment.

We claim:

1. A metallographic microscope for measurement of drawing dies for conductors, comprising:

a body;

a platina movably mounted to the body, said platina having a surface movable in a horizontal direction and a vertical direction;

an eye lens system having an eyepiece for viewing and a portion for receiving a video camera;

an objective lens system mounted to the body and in communication with the eyepiece and the video camera receiving portion facing the movable surface of the platina;

a reflective illumination system mounted to the body in communication with the eye lens system and the objective lens system for projecting light downwardly toward the platina;

a transmitted illumination assembly mounted beneath the platina for projecting light upwardly toward the platina;

a first linear scale extending in a direction parallel to the surface of the platina to measure a position of the platina surface in a horizontal direction;

a second linear scale extending in a direction perpendicular to the surface of the platina to measure a position of the platina surface in a vertical direction;

a positioning device mounted to the surface of the platina to position the drawing dies on the platina;

a light collimating assembly mounted to the body between the platina and the transmitted illumination assembly to furnish a uniformly projected light from the transmitted illumination assembly to the platina, the light collimating assembly including a shaft guide having an opening in communication with the light from the transmitted light assembly, a hollow shaft having an open end opposing the platina, the hollow shaft being movably mounted axially in the shaft guide, and a spring mounted in the shaft guide urging the shaft in a direction to position the open end in contact with the platina;

a power supply mounted in the body for connection to the video camera;

a starting switch mounted to the body;

cabling mounted in the body for connection to the video camera, the power supply and starting switch to provide video output and synchrony signal; and an electronic circuit mounted in the body and coupled to the transmitted illumination system for controlling the light intensity of the transmitted illumination system.

2. The metallographic microscope of claim 1, wherein the electronic circuitry for controlling light intensity includes a closed loop circuit to stabilize power output of the transmitted illumination system.

3. The metallographic microscope of claim 1, further comprising a plurality of connectors and cabling positioned in the body for connecting synchrony and video output signals externally of the body.

* * * * *

UNITED STATES PATENT AND TRADEMARK OFFICE
CERTIFICATE OF CORRECTION

PATENT NO. : 5,457,571
DATED : October 10, 1995
INVENTOR(S) : Daniel A. LONGORIA It is certified that error appears in the above-indentified patent and that said Letters Patent is hereby corrected as shown below:

Title page, item [54] and col. 1, lines 1-2,
Change title from "METALLOGRAPHIC MICROSCOPE USEFUL FOR THE CHARACTERIZATION OF CONDUCTORS DRAWING DIES" to

--METALLOGRAPHIC MICROSCOPE FOR CHARACTERIZING CONDUCTOR DRAWING DIES--.

Title page, item [73],
In line 2 of the Assignee's name, "SA.DE" should read

--S.A. DE--.

UNITED STATES PATENT AND TRADEMARK OFFICE
CERTIFICATE OF CORRECTION

PATENT NO. : 5,457,571
DATED : October 10, 1995
INVENTOR(S) : Daniel A. LONGORIA It is certified that error appears in the above-indentified patent and that said Letters Patent is hereby corrected as shown below:

Claim 3, column 6, lines 4-5, "and cabling positioned in the body for connecting" should read --positioned in the body and connected to the cabling for connecting the--.

Signed and Sealed this

Eighteenth Day of February, 1997

Attest:

BRUCE LEHMAN

Attesting Officer    Commissioner of Patents and Trademarks